Mar. 13, 1923.

D. W. SLATTERY

VALVE

Filed Feb. 9, 1921

1,448,717

2 sheets-sheet 1

Inventor
Donald W. Slattery
by
Thurston River & Hudson
attys

Patented Mar. 13, 1923.

1,448,717

UNITED STATES PATENT OFFICE.

DONALD W. SLATTERY, OF EAST CLEVELAND, OHIO, ASSIGNOR TO THE WELLMAN-SEAVER-MORGAN COMPANY, OF CLEVELAND, OHIO, A CORPORATION OF OHIO.

VALVE.

Application filed February 9, 1921. Serial No. 443,556.

*To all whom it may concern:*

Be it known that I, DONALD W. SLATTERY, a citizen of the United States, residing at East Cleveland, in the county of Cuyahoga and State of Ohio, have invented a certain new and useful Improvement in Valves, of which the following is a full, clear, and exact description.

This invention relates to valves of the plunger type, particularly hydraulic valves.

As is well known, hydraulic valves of the plunger type include an outer casing and an inner chamber supported centrally of the casing so that a water passage will be formed around the chamber, and composed of a fixed part and a movable part or plunger with a sliding or telescoping connection with the fixed part so that it may be moved axially of the casing to open and close the valve. In these valves the plunger may be operated in different ways, either hydraulically or mechanically.

Heretofore, as far as I am aware, when it became necessary to replace or repair any part or parts in the inner chamber, it has been necessary to shut down the plant with which the valve is employed, and drain the pipe line, and should the valve be of such a size that it would not be advantageous to repair it in the pipe line, it is usually necessary to remove the valve from the line for repairs. With large size valves and with the pipe line of sufficient size that a man could work in it, usually the repairs can be made by draining the pipe line and opening the chamber so that a workman may enter it and do the repairing from the interior of the valve. In either case it is necessary that the plant be shut down and the pipe line drained. However, in most installations this cannot be done conveniently, and generally it can be done only under a serious handicap, and with high plant losses.

The chief object of the present invention is to provide a construction wherein access may be had to the interior of the inner chamber for replacement or repairs of any part therein without draining the line in which the valve is used, and preferably with the valve open and water passing through the water passageway between the chamber and the casing.

Further the invention aims to provide improved means for flushing the inner chamber to clear it of silt and dirt which may have collected therein and lodged at the bottom of the chamber, or may have collected on the inner walls, and particularly on the portions of the latter which form bearing or sliding surfaces for the plunger or nose of the valve.

Figure 1:
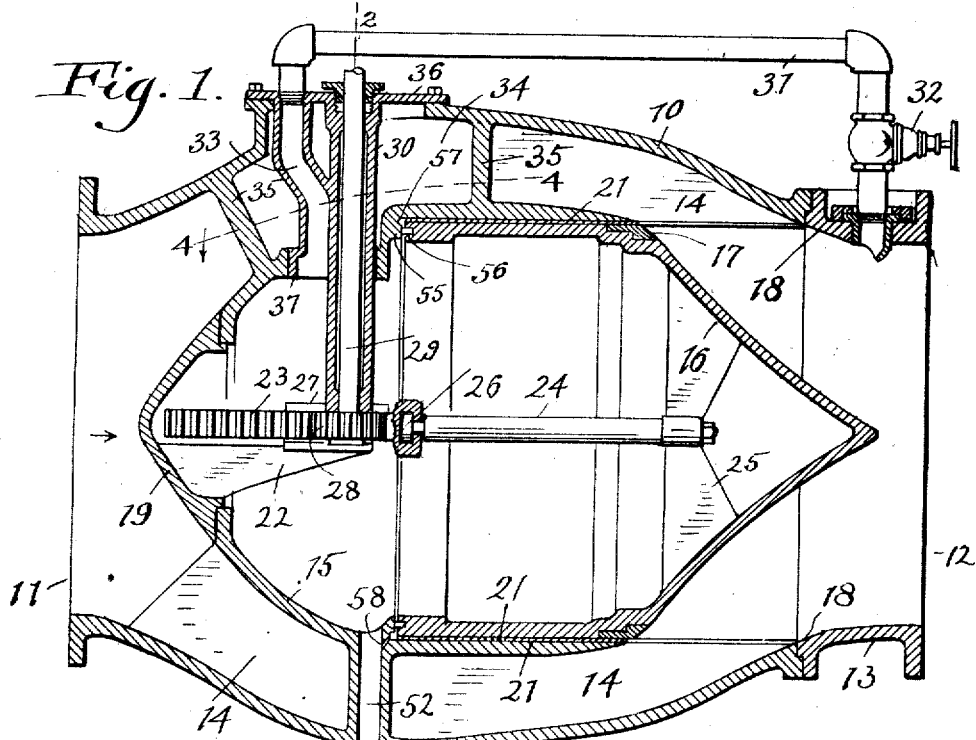
Figure 3:
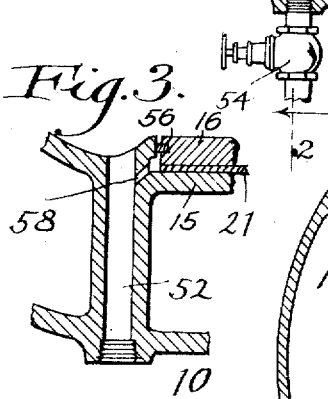
Figure 2:
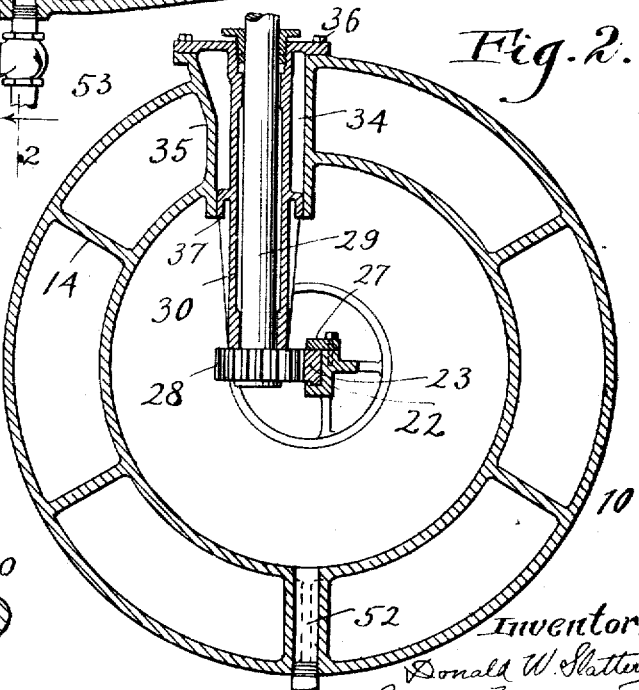
Figure 4:
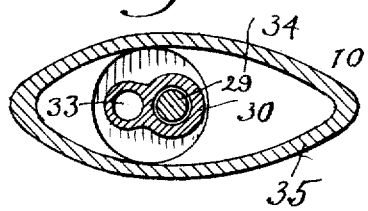
Figure 5:
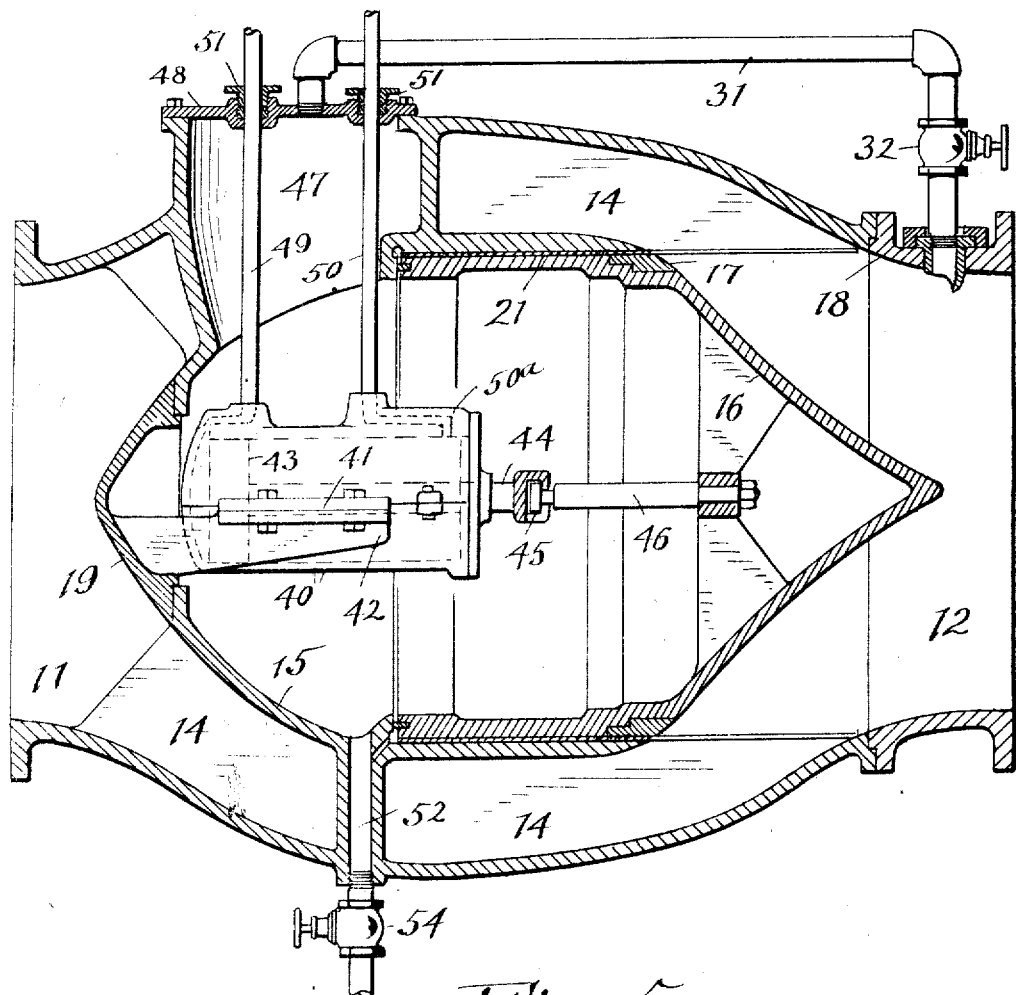

My invention may be used advantageously either in a valve of the pressure operated type, such as a valve having so-called differential pressure chambers, or one wherein the plunger is operated by an operating cylinder, such as shown in my prior application, Serial No. 385,684, filed June 1, 1920, or in a valve of the mechanically operated type wherein the plunger is operated by a rack and pinion or other mechanical means extending to the exterior of the casing, and body types are shown in the drawings, wherein Fig. 1 is a longitudinal sectional view of a mechanically operated valve embodying my invention; Fig. 2 is a transverse sectional view substantially along the line 2—2 of Fig. 1, looking in the direction indicated by the arrow; Fig. 3 is an enlarged fragmentary sectional view; Fig. 4 is a sectional view substantially along the line 4—4 of Fig. 1; and Fig. 5 is a view similar to Fig. 1, showing a hydraulically operated valve.

In the drawings, 10 represents the outer casing which is circular in cross section, and may be formed in any suitable manner, such as from a casting, or partly from a casting and partly from sheet metal. The inlet end 11 and the outlet end 12 may be of equal or unequal sizes, but in this instance are shown of equal size, and in this case the outlet end is provided with a separate casting 13 attached to the body portion of the casing simply for convenience in assembly.

The inner chamber is supported in the outer casing by radial ribs 14, and this casing is composed of a cylindrical fixed portion 15 and a movable portion 16 constituting the plunger of the valve, and is guided by a sleeve-like section of the stationary portion, and also by the ribs 14, the plunger 16 having near its outer periphery a seat 17 which is adapted to engage a stationary seat or ground portion 18 adjacent the outlet end of the valve, and in this instance a portion of the casting 13.

The upstream end of the fixed portion 15 of the inner chamber is preferably conical, and in this case, though not necessarily, it is provided with a separate cap 19, this cap in the embodiment shown, constituting a support for a rack or water cylinder to be referred to presently. The nose of the plunger is also preferably conical, and it can be in the form of a straight cone, or flared, as may be found desirable.

Preferably the inner surface of the stationary part 15 of the inner chamber along which the plunger 16 slides is provided with a non-corrodible lining indicated at 21. Likewise the guiding surfaces of the ribs are preferably covered with the non-corrodible liners.

Although as previously stated, it is immaterial to the principal features of my invention in what manner or by what mechanism the valve is operated, in Fig. 1 rack and pinion gearing is provided for moving the plunger 16 to open and close the valve. The cap 19 at the upstream end of the inner chamber has a forwardly projecting support 22 constituting a guide for a movable rack 23 whose forward end is connected by a rod 24 to a boss at the center of ribs 25 cast integral with the nose of the plunger. The rack has a detachable connection with the rear end of the rod, as shown at 26, and the guide or support 22 has a removable top plate 27 so as to permit convenient replacement of these parts if necessary.

The rack is engaged by a pinion 28 at the lower end of an operating shaft 29 which extends up through the stationary part of the inner chamber and out to the exterior of the casing 10, the shaft being supported in a shaft bearing or sleeve 30.

An equalizing pipe 31 is preferably employed for the purpose of maintaining at all times in the inner chamber the same pressure that exists on the nose of the plunger, so that the opening or closing of the valve will not be affected in any way by a variation of pressure on the nose of the valve, as fully described in my prior application above referred to and broadly claimed therein. This equalizing pipe 31 which is preferably provided with a shut-off valve 32, at one end is connected to the interior of the casing 10 close to the stationary valve seat 18, and at its other end is connected by means of a port or passageway 33 to the interior of the inner chamber, composed of the parts 15 and 16.

Coming now to the important feature of the invention by which access is provided from the exterior of the casing 10 to the inner chamber, I provide for this purpose what may be termed an access chamber or well extending from the exterior of the casing 10, preferably at the top thereof, to the inner chamber across the water passageway between the casing and chamber. This well which is designated 34 in Figs. 1 to 3, has upright walls 35 integral with the casing 10, and stationary part 15 of the inner chamber, so as to prevent entirely the flow of water from the water passageway between the casing and chamber to the access well 34, and preferably the walls 35 form an elliptical or elongated well 34 so as not to interfere with the free flow of water through the water passageway, and preferably the outer casing 10 is somewhat enlarged in the region of this access well so as to compensate for the space occupied by this well and its surrounding wall and permit the water to flow through the casing from one end to the other with uniform velocity.

In this instance the top of the access well 34 is normally closed by the cover 36 which will be fastened down by screws or bolts to the casing 10, and preferably the pinion shaft is brought up through this access well and the port or passageway 33 which connects the equalizing pipe 31 to the inner chamber is likewise brought through this access well. In this instance the bearing 30 of the pinion shaft and the port or passageway 33 are formed integral with the cover 36 so that after the pipe 31 is disconnected from the cover the pinion and its shaft, the bearing for the shaft and the cover 36 can be removed as a unit from the valve.

The relative sizes of the top opening of the access well which is closed by the cover, and the lower opening where the access well communicates with the inner chamber 15, 16, may be anything desired, and will depend in large measure upon the design of the valve, but in this instance the top opening is somewhat larger than the bottom opening, the bottom opening being in this case circular and receiving a circular enlargement 37 of the casting including the cover and the shaft bearing 30 and passageway 33 so as to centralize and form a firm support for the pinion shaft and its bearing.

In any event, the access well 34 including its top and bottom openings will be of such a size that when the top of the cover and the parts extending down through the access well to the interior of the valve are removed, access can be had to the inner chamber for replacement or repairs of any part within it, and for removal of any of the operating parts in the chamber. In this instance, the cover 36 and parts cast integral with it, the pinion and its shaft may be withdrawn as a unit from the valve, after which the rack can be loosened and removed if necessary, and the same is true of other parts in the inner chamber. For relatively small valves this replacing or repairing can be done from the exterior of the casing 10 by reaching down into the well, but on relatively large valves the well with its top and bottom openings will be large enough to permit a workman to pass down through them into the inner chamber, and while therein to make the necessary replacements or repairs.

In the appended claims directed to the construction above explained, I have used the expression "access well" by which expression I mean a well through which access may be had to the inner chamber for replacement or repairs with the work done from the exterior through the well, or by a workman in the inner chamber in which event the size of the well and the construction are such as to permit a workman to enter the inner chamber through the well.

It has already been stated that my invention has the same utility with hydraulically operated valves as with mechanically operated valves, and in Fig. 5 I have shown a valve which is in the main like that shown in Fig. 1, but in this instance the valve is moved to open and closed position by a water cylinder 40 located and supported in the inner chamber. In this case the cylinder has flanges 41 on its sides. These flanges rest on, and are bolted to arms 42 which are cast integral with the cap 19 on the stationary part 15 of the inner chamber. The cylinder contains a working piston 43, having a plunger 44 which is detachably connected at 45 to a rod 46 which corresponds to the rod 24 of Fig. 1, and at its forward end is connected to the nose of the plunger 16.

This valve, like the one first described, has an access and inspection well, here designated 47, and as in the first case, extending from the outer casing down through the main water passageway surrounding the inner chamber into the inner chamber. The top of the well 47 is normally closed by a cover 48 bolted in place, and in this instance the equalizing pipe 31 is attached to the cover and communicates with the inner chamber through the well 47. Likewise this well forms a convenient passageway for the pipes 49 and 50 which are required to supply water pressure to and exhaust it from opposite sides of the piston 43. With these pipes any suitable control valve may be utilized to supply pressure to one side of the piston and to simultaneously exhaust pressure from the opposite side. In this case the pipes 49 and 50 pass through stuffing box glands 51 in the cover, and at their lower ends are attached to bosses on the water cylinder 40.

It will be seen that after the equalizing pipe 31 is disconnected from the cover 48 and the cover itself is loosened from the casing 10, the cover with the stuffing box glands can be slid off the pipes 49 and 50, after which the pipes 49 and 50 can be removed. Should it be desired to remove the cylinder 40, this can be done by loosening the bolts attaching it in place, disconnecting the plunger 44 from the rod 46, and by then lifting the cylinder out through the well. In small valves this can be done from the exterior of the casing, but for large valves the well will be made sufficiently large for the entrance of a workman into the inner chamber.

To render effective the application of the inspection and access well to plunger type valves of the mechanically or hydraulically operated type as exemplified by the two constructions herein illustrated, it is necessary that the inner chamber be emptied of water, and that the flow or passage of water through the clearance between the movable and stationary parts 16 and 15 of the inner chamber be wholly or substantially wholly stopped.

Ordinarily there would be a considerable flow of water into the inner chamber from the exterior through the clearance space above referred to, but by the features which I will now describe, I am enabled to practically entirely prevent the flow of water into the inner chamber when the valve is in full open position and water is flowing through the passageway between the inner chamber and the outer casing, so that it will be both convenient and absolutely safe to make the replacement or repairs by a workman inside the inner chamber.

These features include the provision of a drainage port 52 through a slight enlargement in the lowermost rib 14 as shown in Figs. 1, 2 and 5, which port extends from the inner chamber through the outer casing, and has connected to it a drainage pipe 53 controlled by a valve 54. By opening the valve 54 the water can be drained from the inner chamber. Likewise these features provide for clearing the lower part of the chamber of silt or dirt which may have collected therein.

Additionally an annular shoulder 55 is provided on the fixed part 15 of the inner chamber, which shoulder is adapted to be engaged by a packing or other seat 56 carried by the inner end of the plunger or movable part 16 of the valve, when the valve is in full open position shown in Figs. 1 and 5. Engagement of the parts 55 and 56 obviously prevents leakage of water to the inner chamber, and if a slight amount should enter the chamber it would be of no consequence since the drain 53 would carry it off.

In connection with these parts just described, I provide another feature of importance, this being the provision of means for clearing the surfaces of the inner and outer sliding parts 15 and 16 of the valve of silt or dirt which may have collected on these walls. Generally foreign matter collecting on these walls is pushed back by the engaging sliding surfaces toward the shoulder 55, and I therefore provide an annular flushing groove 57, shown most clearly in Fig. 3, this groove being formed just outside of the shoulder 55 or outside that part thereof which is engaged by the packing or seat 56. In other words, the groove is in line with the clearance space between the sliding surfaces of the two parts of the valve. Additionally I provide at the bottom of the groove a port 58 which connects the groove with the port or passageway 52. Therefore, whenever the valve 54 is opened, the groove 57 is flushed and thoroughly cleaned of any foreign matter in it. This flushing feature can be made use of whenever it is desired to clear the inner chamber of silt or foreign matter, irrespective of whether it is desired to make use of the inspection and access well for the purpose of replacement or repairs.

Therefore, by the provision of the above mentioned features, when the valve is in full open position and the water is drained from the inner chamber by opening the valve 54, the well can be opened and the operating parts disconnected or removed if necessary from the exterior of the casing, or by a workman inside the inner chamber, and this can be done with absolute safety both to the workman and to the valve, for the reason that the pressure on the nose of the plunger created by the flow of water through the water passageway surrounding the inner chamber and the absence of pressure inside the chamber eliminate entirely the danger of the valve closing.

Thus it will be seen that I have provided an improvement of great practical importance in plunger operated valves by the provision of means for the inspection, replacement or repairs of any parts inside the inner chamber without the necessity for draining the pipe line and shutting down the plant with which the pipe line is used, and without even stopping the flow of water through the pipe line by the closure of the valve, and also by the provision of means for flushing silt or dirt from the inner chamber and of clearing it from the walls.

It might be mentioned in conclusion that with the pressure operated valve shown in Fig. 5, the pipe 50 which supplies pressure to the front end of the cylinder during the opening movement of the valve and exhausts it from the front side during the closing movement is connected by a port designated 50ᵃ to the cylinder, this port being preferably so located that just as the valve is about to seat or reach its full closed position, this port is partially closed by the piston so as to provide a cushioning effect which further enhances the quiet seating of the valve.

Having described my invention, I claim:

1. In a valve of the plunger type, an outer casing, an inner chamber supported in the casing so as to provide a water passageway between the casing and the chamber and composed of relatively movable parts, and an access well extending from the outer casing across said water passageway to the inner chamber.

2. In a valve of the plunger type, an outer casing, an inner chamber supported centrally within the casing thereby providing an annular water passage between the casing and the chamber, said chamber being composed of a stationary part and a movable nose or plunger, an access well extending from the outer casing across said passageway to the inner chamber, and means for draining water from the chamber.

3. In a valve of the plunger type, an outer casing, an inner chamber supported centrally within the casing thereby providing an annular water passage between the casing and the chamber, said chamber being composed of a stationary part and a movable nose or plunger, an access well extending from the outer casing across said passageway to the inner chamber, said well where it bridges the water passageway being elongated in the direction of the valve.

4. In a valve of the plunger type, an outer casing, an inner chamber supported substantially centrally in the casing so as to provide a water passageway between the casing and the chamber, said chamber being composed of a fixed part and movable nose or plunger, an access well extending from the casing across said passageway to the inner chamber and including a wall bridging said passageway and integral with the casing and with the fixed part of said inner chamber.

5. In a valve of the plunger type, an outer casing and an inner chamber supported substantially centrally within the casing so as to provide a water passageway between the casing and chamber and composed of a fixed part and movable nose or plunger, means for shifting the nose or plunger and including one or more devices extending across the passageway to the outer side of the casing, an access well extending from the casing to the fixed part of said inner chamber across said water passageway, said device or devices extending through said well.

6. In a valve of the plunger type, a casing, a chamber supported inside the casing so as to provide a water passageway between the casing and chamber, said chamber being composed of a fixed part and a plunger slidingly engaging the fixed part, an access well extending across said passageway from the casing to the fixed part of the inner chamber, and means for preventing the flow of water to the inner chamber by leakage between the fixed part and plunger of the chamber when the valve is in full open position.

7. In a valve of the plunger type, an outer casing, an inner chamber supported substantially centrally therein so as to provide a water passageway between the casing and the chamber and composed of a fixed part and a movable part slidingly engaging the fixed part, an access well extending across said passageway from the outer casing to the fixed part of the inner chamber, means for draining water from the inner chamber, and means for preventing leakage of water between the fixed and movable parts of the inner chamber when the valve is in full open position.

8. In a valve of the plunger type, an outer casing, an inner chamber composed of a fixed part and a movable part slidingly engaging the fixed part, said chamber being supported in the casing so as to provide a water passageway between the casing and the chamber, said fixed and movable parts of the chamber having portions which abut when the valve is full open so as to prevent the passage of water to the inner chamber through the clearance space between the fixed and movable parts of the chamber, and means for flushing the clearance space to free the same of foreign matter which may have collected on the relatively sliding surfaces.

9. In a valve of the plunger type, an outer casing, an inner chamber supported substantially centrally in the casing so as to provide a water passageway between the casing and the chamber and composed of a fixed part and a movable part slidingly engaging the fixed part, the fixed part having an annular abutment adapted to be engaged by the end of the movable part when the valve is in full open position so as to prevent the leakage of water into the inner chamber through the clearance between the stationary and movable parts, an annular groove or receptacle outside the abutting portions of the fixed and movable parts when the valve is fully open, and means for flushing said groove or receptacle of foreign matter which may have collected therein.

10. In a valve of the plunger type, an outer casing, an inner chamber supported in the casing so as to provide a water passageway between the casing and chamber and composed of a fixed part and a movable part in the form of a plunger slidingly engaging the fixed part, an equalizing pipe having a shut-off valve and communicating with the inner chamber and adapted to communicate with a point in the water-line so as to normally maintain substantially the same pressure inside the chamber as exists exteriorly on the nose of the plunger, and an access well extending from the casing to the inner chamber.

11. In a valve of the plunger type, an outer casing, an inner chamber supported in the casing so as to provide a water passageway between the casing and chamber and composed of a fixed part and a movable part in the form of a plunger slidingly engaging the fixed part, an equalizing pipe having a shut-off valve and communicating with the inner chamber and adapted to communicate with a point in the water-line so as to normally maintain substantially the same pressure inside the chamber as exists exteriorly on the nose of the plunger, an access well extending from the casing to the inner chamber, and means for draining the inner chamber.

In testimony whereof, I hereunto affix my signature.

DONALD W. SLATTERY.